June 20, 1961
M. STAUNT
2,989,317
CHUCKS FOR DENTAL HANDPIECES
Filed April 28, 1960
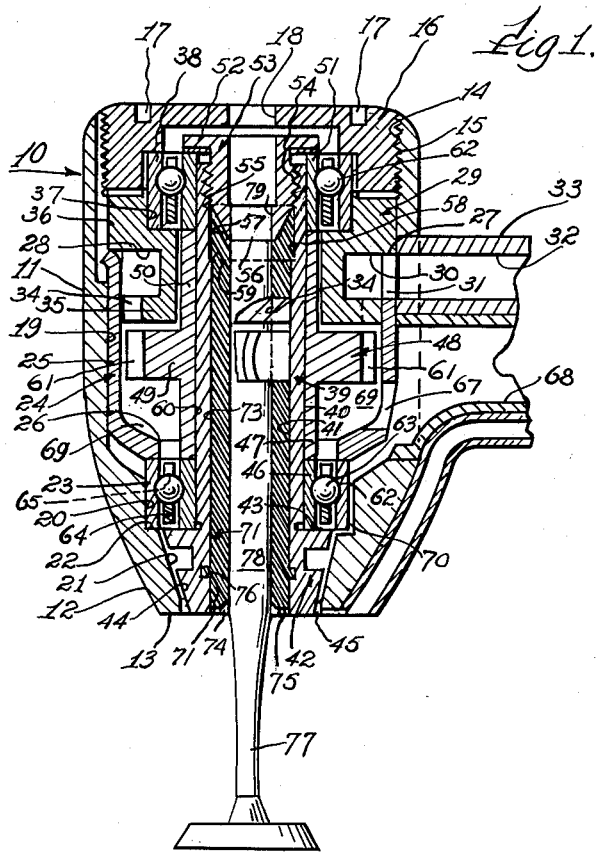
INVENTOR.
Martin Staunt
BY Robert H. Staudt
Attorney United States Patent Office 2,989,317
Patented June 20, 1961

2,989,317
CHUCKS FOR DENTAL HANDPIECES
Martin Staunt, 4439 W. Rice St., Des Plaines 51, Ill.
Filed Apr. 28, 1960, Ser. No. 25,446
7 Claims. (Cl. 279—102)

The present invention relates to chucks for dental handpieces and methods of making them, and is particularly concerned with the provision of improved structures for the chucks of air driven dental handpieces and methods of installing such chucks.

The present application is a continuation-in-part of my prior application, Ser. No. 776,037, filed November 24, 1958, on Chucks for Dental Handpieces, and my prior application, Ser. No. 633,068, filed January 8, 1957, now Patent No. 2,911,721, on Contra Angles for Dental Handpieces.

The parent applications referred to relate to dental handpieces having a hollow tubular shaft which is provided with a tubular sleeve of plastic that is frictionally or otherwise anchored in the tubular shaft and is adapted to receive the cylindrical shank of a dental bur or other grinding tool that is forced in by hand and is frictionally held by the plastic sleeve.

Such a plastic sleeve must sometimes be removed and replaced with a new plastic sleeve; and it is of the utmost importance that the plastic sleeve have its cylindrical bore and its cylindrical outer surface accurately concentric.

In the molding of such plastic sleeves for this purpose it is difficult to get an even distribution of the plastic on all sides of the sleeve or tube such as is necessary to assure the concentricity; and one of the objects of the invention is the provision of an improved plastic sleeve structure which can be molded and in which the concentricity of the inner and outer surfaces is assured.

Such plastic sleeves for use as a chuck generally have the leading end, which is to be inserted first in the shaft, provided with a slight taper, such as one thousandth of an inch, and it has been necessary to mark the smaller end of each chuck sleeve for the purpose of making sure that the smaller end is selected to be inserted first.

Another object of the invention is the provision of an improved plastic sleeve structure with which there is no possibility of the user inserting the wrong end, since the free end is made slightly smaller and the other end is provided with an integral plastic disc that may be used for manually pressing the sleeve into the shaft.

Another object of the invention is the provision of an improved chuck sleeve structure provided with an integral head that is to be used in pressing the sleeve into the shaft in which the head or disc may be quickly removed from the sleeve after it has accomplished its purpose of serving as a thumb piece for transmitting pressure.

Another object of the invention is the provision of an improved method of installing plastic sleeves for chucks by means of which such plastic sleeves may be more readily installed and sufficient pressure applied to anchor them, and thereafter the manual disc at the end of the plastic sleeve may be snapped off, leaving the plastic sleeve alone in the shaft.

Another object of the invention is the provision of an improved and simple tool by means of which an integral disc on the end of a plastic sleeve may be easily fractured and removed from the sleeve, leaving the sleeve intact in the hollow shaft.

Other objects and advantages of the invention will be apparent from the following description and the accompanying drawings, in which similar characters of reference indicate similar parts throughout the several views.

Referring to the single sheet of drawings:

FIG. 1 is a fragmentary sectional view taken on the plane which intersects the axis of an air turbine assembly of an air driven dental handpiece embodying the invention;

FIG. 2 is an enlarged view in perspective of a plastic sleeve assembly for use in replacing the plastic sleeve chuck in FIG. 1;

FIG. 3 is a fragmentary sectional view of a part of FIG. 1, showing the plastic sleeve unit of FIG. 2 in the first step of its installation;

FIG. 4 is a view similar to FIG. 3, showing the next step in the installation of the plastic sleeve, which involves the insertion of a mandrel having an over-size enlargement that so spreads the plastic sleeve inside the disc that the disc is fractured from the sleeve.

Referring to FIG. 1, this is an enlarged axial sectional view of an air driven dental handpiece head, indicated by the numeral 10, and equipped with a plastic sleeve chuck embodying the invention. The head 10 has a substantially cylindrical body 11, which is tapered inward and rounded at 12 toward the tool end 13 of the body.

At its other end there is a cylindrical opening provided with internal threads 14 for engaging the complementary threads 15 carried by a screw cap 16 having sockets 17 for a spanner wrench and having a central opening 18, which may be used in pushing out bur shanks by means of a tool.

The body 11 has a cylindrical bore 19; and it has a smaller counterbore 20 and a frusto-conical bore 21 at its lower end. The body has an annular shoulder at 22, against which the outer race 23 of a ball bearing rests.

The turbine unit is indicated by the number 24; and it includes a thin cylindrical steel shell 25, which fits in the bore 19, and has an annular end 26 resting against the top of the outer race 23.

The shell 25 has its upper end 27 engaged by the surface 28 on a stator, indicated at 29. The stator 29 comprises a cylindrical member having an annular groove 30, which communicates with an air inlet 31 leading to an air conduit 32 in the handle 33 of the handpiece. The annular groove 30 serves as an air manifold to carry air to a multiplicity of diagonal slots 34, which are formed in the lower flange 35 of the stator 29; and these slots are closed by the shell 25.

The stator 29 has an upper cylindrical body 36 which fits in the housing bore 19; and the stator has a bore 37 adapted to receive the upper outer race 38, which is engaged by the cover cap 16.

The handpiece head 10 has a tubular shaft 39, which has an external cylindrical surface 40 and an internal cylindrical bore 41. The shaft 39 is provided with an enlargement 42 at its lower end, having an annular shoulder 43 and an external frusto-conical surface 44. The internal frusto-conical surface 21 and the external frusto-conical surface 44 form an annular air nozzle 45. The shaft 39 has an inner ball bearing race 46 resting against the annular shoulder 43; and this race is engaged by a tubular extension 47 on a rotor 48.

The rotor has a cylindrical body 49 and a second upper tubular extension 50, which engages the upper inner race 51. This is engaged by a washer beneath the annular flange 52 carried by a screw plug 53, which has external threads 54 engaged in a threaded bore 55 in the shaft. The screw plug has a sharp annular edge 56 at its lower end and a beveled surface 57; and the shaft has a slightly enlarged bore 58 opposite the beveled surface 57, ending at an annular shoulder 59.

The rotor has a bore 60 fitting on the shaft; and the rotor has a plurality of curved slots 61 which are formed by means of a tubular cutter having its axis at right angles to the axis of the rotor. The inner and outer races in each case have continuous ball grooves 62 containing a lesser complement of balls 63 than is needed to fill the grooves, so that the balls may be spaced from each other.

The ball spacing is effected by means of a plastic ball retainer 64 in each case, having a radial bore 65 for each ball, and having an axial slot 66 leading to each bore. The slots 66 are of slightly less diameter than the balls so that the slots 66 must be spread to pass the balls; but they spring back into their narrow position to retain the balls in the bores and to hold the retainer on the balls.

The plastic retainer has a clearance with respect to each race in each case. The air driving the turbine carries lubricant in the form of a mist, which passes through the clearances between the stator and rotor and between the ball races and balls, and out the ends of the housing. Oil is deposited on the balls and the ball bearings are continuously lubricated while they are operating.

The shell 25 has an outlet 67 leading to an outlet conduit 68 in the handle 33; and the air passes in at 31 and is directed toward the rotor slots by the stator slots 34. In the rotor the curved slots receive the air and reverses its direction, discharging it into the space 69, which communicates with the outlet 67 and also with an auxiliary conduit 70, by-passing the lower outer race, and leading to the annular nozzle 45.

The tubular shaft 39 is provided with a chuck in the form of a plastic sleeve 71, which has an inner cylindrical bore 72 and an outer cylindrical surface 73. FIG. 1 shows the plastic sleeve in its proper final location for use, its lower end 74 being slightly below the end 75 of the shaft.

The shaft bore 41 preferably has a shallow annular groove at 76 near its lower end; and the final pressure and sizing of the sleeve by a mandrel forces some of the plastic into the groove 76 to anchor the plastic sleeve in the shaft.

The plastic sleeve is additionally anchored at its upper end by being expanded into the enlarged bore 58 by means of the camming surface 57, effecting an anchor against the annular shoulder 59.

FIG. 1 shows a dental bur 77 having its grinding or tool end 78 located to be cooled by air from the annular nozzle 45.

The shank 78 of the bur is cylindrical and is frictionally gripped by the plastic sleeve 71; but the shank of the bur also projects into a registering bore 79 in the metal screw plug 59, definitely maintaining the concentricity of the shank at that end; and the shank may seat against an annular shoulder 80.

Referring to FIG. 2, this is a view in perspective of an improved chuck sleeve 71, shown on an enlarged scale, which, however, is smaller than that used in FIG. 1. The chuck sleeve 71 is integrally attached to a plastic disc 81, and the sleeve and disc are preferably molded of polyethylene.

The disc is large enough so that it may be engaged by the thumb, as indicated at 82 in FIG. 3; and the disc is preferably molded with an integral rim 83 and a thinner body 84 integrally joined to the lower tubular portion 85.

The upper end 86 of the sleeve is preferably reduced in size, such as a taper of one thousandth of an inch over the full length; and this permits the disc 81 to indicate to the user the smaller end, which is to be inserted first.

According to the prior art it was necessary to color one end of the tube to indicate which is the smaller end, when it had no disc to give this indication.

FIG. 3 shows the hollow shaft 39 and the plastic sleeve 71, which has been inserted into the shaft by pressing on the disc 81 with the thumb; and the sleeve 71 has been pressed in far enough so that its upper end engages the beveled surface 57, which cams the tube outward into the enlargement 58 and anchors it against the annular shoulder 59.

Referring to FIG. 4, the next step in the installation of the plastic sleeve is illustrated in this figure; and the plastic disc has been broken off in FIG. 4, as shown in dotted lines. In order to accomplish this, a tool having a cylindrical handle 86 and a cylindrical mandrel 87 with a rounded end 88 is inserted in the sleeve assembly 71 of FIG. 3. The mandrel 87 is of a suitable size to fit in the bore 72 of the plastic tube 71; but at the base of the mandrel, where it joins the handle 86, the tool is provided with an integral cylindrical enlargement 89 having a tapered portion 90 leading to the enlargement.

The enlargement 89 is pushed into the lower end 85 of the plastic tube 71; and the enlargement so expands the bore at this point that the disc 81 breaks off, leaving the plastic tube 71 substantially flush with the end surface 75 of the shaft. Thereafter an ordinary mandrel not having the enlargement 89 is pressed into the plastic tube 71, driving the plastic into the groove 76 to anchor the plastic tube at that point, and moving the end 74 of the tube into the position shown in FIG. 1, where it is inward of the end surface 75 of the shaft.

The plastic tubes 71 are preferably molded out of polyethylene; and the sprue resulting from this molding operation is broken off from the disc at the point 91.

When such plastic tubes are molded without a disc, the sprue portion is attached to the tube; but it is difficult to secure a concentric distribution of the plastic on all sides of the tube, and such tubes tended to become eccentric. When the tube is molded with an attached disc, the plastic may be fed to the tube cavity from all sides by the disc body, which assures accurate concentricity in the tube.

Therefore, my method of installation of a plastic sleeve in the hollow shaft, as a chuck for frictionally holding a cylindrical shank, preferably includes the molding of the plastic sleeves with an attached disc, which may support the sprue that is broken off from the disc. Thereafter my method includes the installation of the plastic tube by pressing it in manually with the thumb applied to the plastic disc until the disc engages the end of the shaft, during which the plastic tube is forced into anchoring enlargements in the hollow shaft.

The next step in my method is the insertion of a mandrel having an enlargement at its base, where it will be forced into the bore of the tube at the point where it supports the disc 81. This expansion of the tube and disc at the end of the shaft tends to fracture the disc from the tube, leaving the tube flush with the end of the shaft; and this fracture may be partly due to shearing action.

Thereafter the mandrel with the enlargement is removed and the disc is removed; and another mandrel, without such an enlargement, is inserted; and the body of the handle 86 is used to press the end 74 of the plastic tube into the position of FIG. 1, further anchoring the plastic tube in the groove 76, into which it expands.

It will thus be observed that I have invented an improved method of installing plastic tubes for use as a bur chuck in a dental handpiece, such as an air driven handpiece, and an improved plastic tube structure which indicates the end that should be first inserted, and provides a thumb piece for handling the plastic tube, and by means of which it may be pressed into the hollow shaft.

My method includes the fracture of the plastic disc from the tube, leaving the tube anchored in the shaft; and by providing such a disc on the tube the flow of plastic into the tube mold is caused to be accurately concentric.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A replaceable chuck sleeve for holding the shanks of dental burs or the like, comprising a cylindrical tube of plastic having a concentric axial bore adapted to grip a bur shank frictionally, said tube having an integral thin disc at its lower end for grasp with the fingers and engageable with the thumb in forcing the tube into a drive shaft having a complementary bore, to be secured therein.

2. A replaceable chuck sleeve according to claim 1, in which the disc is frangible from the tube at the junction of the tube and the disc for removing the disc and leaving the tube in the shaft bore.

3. A replaceable chuck sleeve according to claim 2, in which the tube is slightly tapered at its leading end for easier insertion into the shaft bore.

4. In a dental handpiece, a chuck assembly, comprising a cylindrical housing having an open lower end with an annular shoulder, a pair of antifriction bearing outer races spaced by a metal sleeve, a tubular shaft having inner races at its ends provided with balls spaced from each other, and a plastic sleeve having radial bores receiving said balls, said shaft having a cylindrical bore open at its lower end and a threaded plug threaded in its upper end, said plug having an annular bevelled camming surface, and an enlarged bore opposite said camming surface, and a plastic chuck tube having an integral disc on its lower end, said tube having a slight taper on its upper end and being forced into said shaft bore manually by applying force to said disc.

5. A chuck assembly according to claim 4, said plastic tube engaging said camming surface and spreading into said enlarged bore against an annular shoulder to anchor the tube in the shaft.

6. A chuck assembly according to claim 4, and a mandrel having a handle and a sliding fit in said plastic tube and a short enlargement on said mandrel insertable in the plastic tube at said disc to fracture the disc from the tube.

7. A chuck assembly according to claim 6, said plastic tube being further driven into the shaft bore to locate its end below the end of the shaft and to expand the plastic tube into an anchoring groove adjacent the open end of the shaft bore.

References Cited in the file of this patent

UNITED STATES PATENTS

| | | |
|---|---|---|
| 1,433,881 | Fancher | Oct. 31, 1922 |
| 2,105,618 | Silva | Jan. 18, 1938 |
| 2,809,846 | Whiteford | Oct. 15, 1957 |
| 2,833,548 | Clark | May 6, 1958 |
| 2,917,829 | Page | Dec. 22, 1959 |